July 6, 1954
H. A. LAND
2,683,064
TENSIONING APPARATUS FOR ENDLESS
TRACKS OF CRAWLER VEHICLES
Filed March 28, 1951
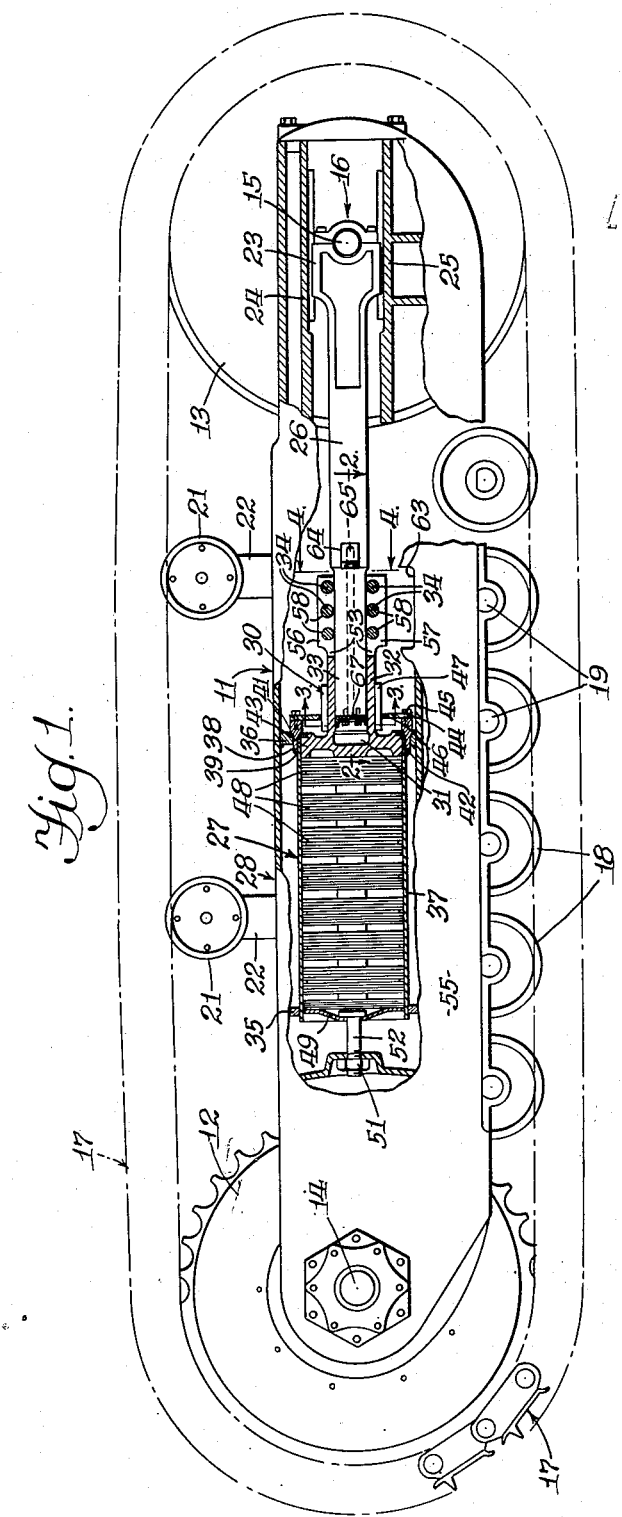
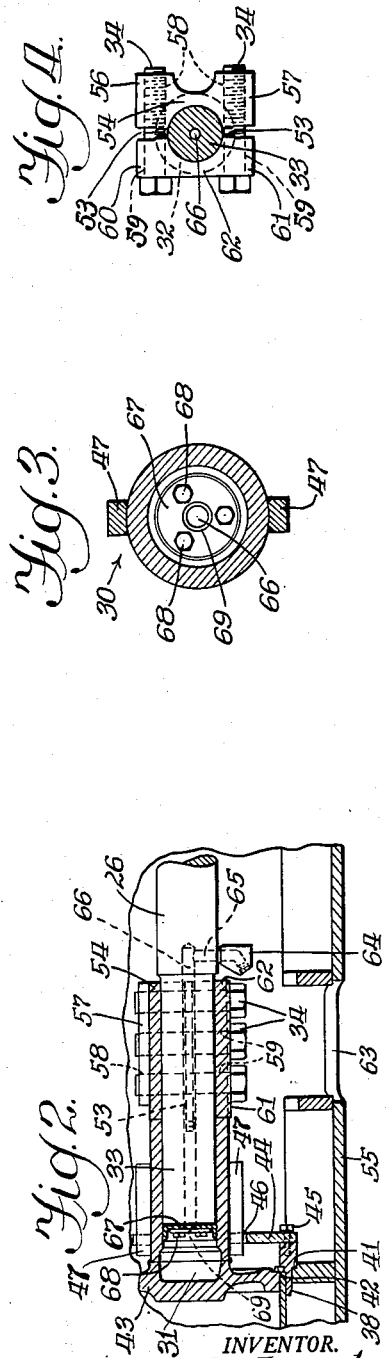
INVENTOR.
Harry A. Land
BY Paul O. Pippel
Atty.

Patented July 6, 1954

2,683,064

UNITED STATES PATENT OFFICE 2,683,064

TENSIONING APPARATUS FOR ENDLESS TRACKS OF CRAWLER VEHICLES

Harry A. Land, Chicago, Ill., assignor to International Harvester Company, a corporation of New Jersey Application March 28, 1951, Serial No. 218,026

3 Claims. (Cl. 305—9)

1

This invention concerns crawler type vehicles wherein there are track frames having endless tracks and more particularly concerns improvements in the apparatus for adjusting tension or the amount of slack in the tracks.

It is standard practice in the construction of crawler vehicles to employ track tensioning means for the endless tracks which revolve about track frames upon opposite sides of the vehicle body. Such vehicles are of the character that are steered by causing the tracks to revolve at selectively different speeds or to proceed in straight course by causing the tracks to revolve at the same speed. Driving force is imparted to each track by a large driving sprocket which is normally within the rear end of an elongated loop formed by such track. An idler wheel normally provides support for the front end of the track where the front end of the track loop is trained about this idler wheel. Desired tautness or limitation of slack in the track is provided for by mounting the idler wheel upon a bearing head therefor slidable endwise of the track frame together with a captive spring assembly mounted on the track frame rearwardly of the idler wheel and against which the bearing head reacts. This captive spring assembly amounts to an overload release mechanism to permit retraction of the idler wheel and thereby prevent an over-tension in the track or breakage thereof by an expansion force which might be caused by a stone or other non-compressible object becoming accidentally wedged between the track and either the sprocket or the wheel.

Adjustment of the track tension is conventionally obtained by an elongatively adjustable thrust structure interposed between the idler wheel bearing head and the overload release assembly. Elongation adjustment of the thrust structure for obtaining the desired amount of tension or limited slack or looseness in the track is customarily accomplished by rotation of threaded members. However, such means of adjustment has been so inconvenient and tedious that operators of the vehicles frequently fail to maintain proper track tension and consequently suffer inordinate wear upon the track and sprockets.

An important object of this invention is the provision of an effective and conveniently adjustable track tensioning apparatus for use instead of the adjusting apparatus referred to above.

A more specific object of the invention is the provision of an improved track tensioning apparatus including an hydraulic ram including

2 passage means conveniently accessible for introducing fluid under pressure into the ram for attaining desired limitation of slack in the track.

These and other desirable objects inherent in and encompassed by the invention will be more readily apparent from the ensuing description, the appended claims, and the annexed drawing, wherein:

Fig. 1 is a side elevational view of a crawler tractor track frame together with parts carried thereby including track tensioning apparatus constituting a preferred embodiment of the present invention, there being parts of the track frame removed and parts of an overload release assembly shown in section to clarify the environment for the invention.

Fig. 2 is an enlarged fragmentary sectional view taken at the plane indicated by the line 2—2 of Fig. 1.

Fig. 3 is transverse sectional view of a ram cylinder taken on the line 3—3 of Fig. 1.

Fig. 4 is a transverse sectional view taken on the plane indicated by the line 4—4 in Fig. 1.

Apparatus as that shown in the drawing is employed on each side of a crawler type vehicle. The apparatus includes a track frame 11 having a track driving sprocket 12 at its rear end and a track idler wheel 13 at its front end. The driving sprocket 12 is rotated about a fixed axis 14 whereas the idler wheel 13 is rotatable about an axis 15 which is adjustable lengthwise of the track with a bearing structure 16. This bearing structure 16, together with the idler 13 constitute a track idler assembly 13—16. An articulated endless track 17 is trained about the driving sprocket 12 and the idler wheel 13. The track frame 11 and the components mounted thereon are carried upon the lower flight of the track by a plurality of track rollers 18 rotatable upon journal shafts 19 therefor fixed upon the lower side of the frame. A pair of track-supporting rollers 21 mounted on brackets 22 projecting upwardly from the track frame support the upper flight of the track 17.

The bearing structure 16 of the front idler assembly is carried upon a cross-head 23 movable endwise of the track frame upon upper and lower guides 24 and 25. A thrust rod 26 for the cross-head projects rearwardly for thrust reaction against an elastically retractible force reaction structure in the form of a captive spring unit 27 of an overload release assembly 28. An expansible connection between the overload release assembly 28 and the thrust rod 26 is provided by an hydraulic ram 30 including a fluid-receiving chamber 31, a cylinder 32 containing a portion of said chamber and a plunger 33 formed upon the rear end of the thrust rod 26. The position of the front idler 13 for limiting the amount of slack in the track 17 can be selectively determined by controlling the amount of fluid in the ram chamber 31. When it is desired to move the idler forwardly for diminishing the slack, fluid will be forced into the chamber 31 and thereby project the plunger 33 and the front idler forwardly the necessary amount. The fluid, which is normally oil, is relatively noncompressible and will maintain the adjustment until this action of the fluid is supplemented by the tightening of cap screws 34 for mechanically interconnecting the cylinder 32 and plunger 33 in a manner presently more fully described.

The track frame 11 is hollow and contains axially spaced braces 35 and 36 in support of a cylindrical spring chamber 37. The rear end of the spring chamber 37 is supported within the brace 35 and the forward end within the brace 36. A ring 38 surrounding and welded to the cylinder 37 at 39 has a shoulder 41 which overlies and reacts against the front side of the brace 36 to prevent rearward movement of the spring chamber. A snap ring 42 in the ring 38 limits forward movement of a spring reaction plunger 43 in the spring chamber 37, and rotation of this plunger coaxially of the chamber is prevented by guides 44 secured to the forward end of the ring 38 by cap screws 45 and containing notches 46 which slidably receive ribs 47 upon the outer periphery of the ram cylinder 32. Ribs 47 are adapted to move endwise within the notches 46.

A plurality of sets of Bellville springs 48 are held captive in a compressed condition between the spring reaction plunger 43 and a rear end wall 49 of the spring chamber. The degree of compression of the Bellville springs is determined by the spacing between the spring reaction elements 43 and 49 and such spacing is selectable by rotating of a nut 51 upon the threaded rear end of adjuster rod 52 which has its front end fixed coaxially to the plunger element 43. This type of captive spring unit is described in detail in U. S. Patent No. 2,506,360.

The ram cylinder 32 constitutes a tubular extension of the spring reaction plunger 43. The forward end of this tubular extension is bifurcated by the formation therein of two diametrically opposite slots 53. The innermost furcation, 54, with respect to the outermost wall 55 of the track frame as shown in Fig. 2, has upper and lower bosses 56 and 57 thereon containing threaded openings 58 for the shanks of the cap screws 34. Corresponding upper and lower bosses 60 and 61, Figs. 2 and 4, are formed on the furcation 62 of the split tube 32 and contain holes 59 respectively for the shanks of the cap screws 34. The heads of the cap screws 34 are accessible through a side wall opening 63 of the track frame; see Fig. 2.

Also accessible through the track frame opening 63 is a grease gun fitting 64 which communicates through a lateral passage 65 in the thrust rod 26 with a passage 66 leading axially through the plunger 33 into communication with the ram chamber 31. A sealing cup 67 of leather or other suitable material is secured to the front end of the ram plunger by cap screws 68, the sealing cup having an opening 69 registering with the plunger passage 66.

Operation of the apparatus

When it is desired to adjust the track tensioning apparatus for diminishing the amount of slack or looseness in the track 17, the cap screws 34 will be loosened by means of a socket wrench or the like projected into engagement therewith through the track frame opening 63. Such loosening of the cap screws 34 permits furcations 54 and 62 of the front end of the cylinder structures 32 to spring apart out of gripping relation with the thrust rod 26. Thereupon the discharge tube of a lubricant gun will be inserted through the track frame opening 63 into communicative attachment with the fitting device 64 and the lubricant gun operated for injecting hydraulic fluid through the passages 65 and 66 into the ram chamber 31. This causes the ram piston 33, thrust rod 26 and idler 13 to be projected forwardly an amount selectable according to the quantity of fluid injected into the ram chamber. Following attainment of the desired adjustment of the front idler, the grease gun will be disconnected from the fitting 64, and the cap screws 34 will be retightened for gripping the furcations 54 and 62 onto the ram plunger to supplement the fluid in the ram for maintaining the adjusted position of the front idler.

Manual loosening and retightening of the cap screws 34 is a relatively easy and convenient operation. Rotation of these cap screws can be effected rapidly by means of a socket wrench operated conventionally by an associated crank. Manually applied force is necessary only for causing the furcations 55 and 62 to be moved between their released or gripping relation with respect to the ram plunger. Relative axial movement of the ram plunger 33 and the cylinder 32 is obtained by hydraulic pressure from the grease gun. The relatively great force at times required for advancing the front idler for diminishing slack in the endless track can be developed conveniently because of the force multiplication possible by use of the force feed grease gun or pump. The convenience and ease with which the adjustment of the track can be made is conducive to the vehicle operator maintaining proper track-tension adjustment.

Having thus described a single preferred embodiment of the invention with the view of clearly and concisely illustrating the same, I claim:

1. In track tensioning apparatus for a crawler tractor having a track frame for the mounting of an endless track, a track idler assembly retractively advanceable on the frame to exert tensioning force against the track, an overload release assembly mounted on the frame in a retractive direction from the idler assembly with reference to the direction of retractive motion of such assembly and including a spring chamber of which the axis is directed toward the idler assembly, a spring structure compressible axially in said chamber and an elastically retractible force-reaction structure in the form of a spring reaction plunger adapted to compress the spring structure and piloted in said chamber, said plunger having a tubular stem projecting endwise therefrom and provided with an inner end and an axially split outer end portion projecting toward the idler assembly, a ram plunger connected with the idler assembly and projecting reciprocally into said stem, means for conducting fluid under pressure into said tubular stem between the inner end thereof and the ram plunger to force such ram plunger into an adjusted position, and means for contracting the split outer end portion of the stem onto the ram plunger to retain the adjusted position thereof.

2. In track tensioning apparatus for a crawler tractor having a track frame for the mounting of an endless track, a track idler assembly retractively advanceable on the frame to exert tensioning force against the track, an overload release assembly mounted on the frame in a retractive direction from the idler assembly with reference to the direction of retractive motion of such assembly and including a spring chamber of which the axis is directed toward the idler assembly, a spring structure compressible axially in said chamber and an elastically retractible force-reaction structure in the form of a spring reaction plunger adapted to compress the spring structure and piloted in said chamber, said plunger having a tubular stem having an inner end and an outer end portion and projecting axially from the plunger to place the outer end portion toward the idler assembly, a ram plunger connected with the idler assembly and projecting reciprocally into said tubular stem, means for conducting fluid under pressure into said stem between the inner end thereof and the ram plunger chamber to force such ram plunger into an adjusted position, and means for releasably interconnecting the ram plunger and stem to retain the adjusted position thereof.

3. In track tensioning apparatus for a crawler tractor having a track frame for the mounting of an endless track, a track idler assembly retractively advanceable on the frame to exert tensioning force against the track, an overload release assembly mounted on the frame in a retractive direction from the idler assembly with reference to the direction of retractive motion of such assembly and including a spring chamber of which the axis is directed toward the idler assembly, a spring structure compressible axially in said chamber and an elastically retractible force-reaction structure in the form of a spring reaction plunger adapted to compress the spring structure and piloted in said chamber, said plunger having a fluid-receiving chamber and a tubular stem having an inner end communicative with the chamber and an outer end portion and projecting axially from the plunger to place the outer end portion toward the idler assembly, a ram plunger connected with the idler assembly and projecting reciprocally into said stem, means including a channel leading axially in the ram plunger into communication with the chamber and for conducting fluid under pressure into such chamber to force the ram plunger into an adjusted position, and means for releasably interconnecting the ram plunger and stem to retain the adjusted position thereof.

References Cited in the file of this patent

UNITED STATES PATENTS

| Number | Name | Date |
|---|---|---|
| 1,442,569 | Holt | June 16, 1923 |
| 1,503,280 | Osbourne | July 29, 1924 |
| 2,383,754 | Watt | Aug. 28, 1945 |
| 2,452,671 | Merrill | Nov. 2, 1948 |
| 2,506,360 | Henning | May 2, 1950 |